United States Patent
Eriksen et al.

(10) Patent No.: US 7,413,662 B2
(45) Date of Patent: Aug. 19, 2008

(54) PREPARATION AND USE OF SORPTIVE LIGNOCELLULOSIC MATERIAL FOR DECONTAMINATION OF FLUID AND AQUEOUS MEDIA

(75) Inventors: Per Berre Eriksen, Vordingborg (DK); John Mark Lawther, Roskilde (DK); Peter Larsen, Lundby (DK)

(73) Assignee: Danish Plant Fibre Technologies Holding A/S, Vordingbord (DK)

( * ) Notice: Subject to any disclaimer, the term of this patent is extended or adjusted under 35 U.S.C. 154(b) by 0 days.

(21) Appl. No.: 11/793,590

(22) PCT Filed: Dec. 20, 2005

(86) PCT No.: PCT/DK2005/000805

§ 371 (c)(1),
(2), (4) Date: Sep. 18, 2007

(87) PCT Pub. No.: WO2006/066586

PCT Pub. Date: Jun. 29, 2006

(65) Prior Publication Data

US 2008/0017581 A1 Jan. 24, 2008

(30) Foreign Application Priority Data

Dec. 22, 2004 (DK) .............................. 2004 01978

(51) Int. Cl.
*B29D 7/00* (2006.01)
*B01D 17/02* (2006.01)

(52) U.S. Cl. ................ 210/680; 210/693; 536/64; 8/129; 502/404

(58) Field of Classification Search ............... 536/64; 8/129; 210/680, 690, 691, 692, 693; 502/404
See application file for complete search history.

(56) References Cited

U.S. PATENT DOCUMENTS

| | | | |
|---|---|---|---|
| 2,301,263 A | 11/1942 | Dreyfus et al. | |
| 2,358,387 A | 9/1944 | Dreyfus et al. | |
| 2,372,386 A | * 3/1945 | Moncrieff et al. | 8/129 |
| 2,534,371 A | * 12/1950 | Richter, Jr. | 536/64 |
| 3,788,984 A | 1/1974 | Teng et al. | |
| 4,804,384 A | 2/1989 | Rowell et al. | |

FOREIGN PATENT DOCUMENTS

| | | |
|---|---|---|
| GB | 523 774 A | 7/1940 |
| GB | 532 673 A | 1/1941 |
| GB | 2 248 610 A | 4/1992 |

* cited by examiner

*Primary Examiner*—Chester T Barry
(74) *Attorney, Agent, or Firm*—Birch, Stewart, Kolasch & Birch, LLP

(57) ABSTRACT

A modified sorptive lignocellulosic fibre material with hydroxyl groups on the lignocellulosic fibres doubly modified by esterification with a combination of monocarboxylic and dicarboxylic acid ester groups. A process for the preparation of the sorptive material. The sorptive fibre material is effective for the removal of oils and other contaminants including heavy metals from a fluid such as contaminated water by a combined sorption of hydrophobic contaminants and ion exchange.

13 Claims, No Drawings

PREPARATION AND USE OF SORPTIVE LIGNOCELLULOSIC MATERIAL FOR DECONTAMINATION OF FLUID AND AQUEOUS MEDIA

TECHNICAL FIELD

The present invention relates to a modified sorptive lignocellulosic fibre material with hydroxyl groups on the lignocellulosic fibres modified in the form of carboxylic ester groups, a process for the preparation of the sorptive fibre material, a method for the removal of oils, metal ions and other contaminants from a fluid medium, such as an aqueous medium, and the use of the sorptive fibre material for the removal of oils, metal ions and other contaminants from a fluid medium.

TECHNICAL BACKGROUND

There is considerable interest in developing and using materials capable of absorbing or adsorbing contaminants from contaminated fluid media. Such contaminants include organic materials as well as ionic materials including heavy metals. Examples of contaminated fluid media include but is not limited to aqueous media such as waste water, industrial waste water, potable water or natural water systems such as lakes, rivers, seas and the like which have become naturally or artificially contaminated. It is very important, for obvious reasons, that such materials are not prohibitively expensive and that they can be used in relatively simple, cost-effective ways.

A good illustrative example is the removal of contaminating oils from waste water, harbour water, water from road run-off etc. In such cases, much of the oil contaminant floats on the water surface and can be removed either centrifugally or even more simply in a standard separator device. Such devices are well-known to those familiar with the techniques involved in water-cleaning. However, it is difficult to remove the final few percent of the oil using such methodology, and some of the oil inevitably becomes emulsified into the water, and cannot be removed in such a straightforward physical manner. In order to remove the last part of contaminating oils from water, it is usually necessary to expose the water to some type of sorptive material, in the form of a filter, filter cartridge or other suitable device.

"Sorptive materials" or "sorbants" are materials having absorbing and/or adsorbing properties. Commonly used sorbants are inorganic powders with hydrophobic surfaces, glass and silica beads and "resins", activated carbons, and even simple hydrophobic materials such as polypropylene. The more effective sorptive materials such as activated carbons are expensive and difficult to handle.

A further example is the removal of dissolved heavy metal cations from waste water or other water streams. The most common methods of treatment are either via precipitation of the metals as insoluble salts, or by the use of an ion exchange resin or material that actively removes the ions from solution by chemical sorption. Ion-exchange resins are very expensive and the high price of such materials means that they have to be re-used or recycled many times to justify utilization. Additionally, if the aqueous medium to be treated contains other contaminants, particularly organic materials such as oils, then the performance of ion exchange resins can be impaired. In that case the efficiency of the ion exchange resin decreases, the necessary treatment time per liter water increases and the treatment becomes very expensive. Precipitation technologies are cheaper, but often require long treatment times and extensive use of settlement and sedimentation tanks.

The term "lignocellulose" means any of several closely related substances constituting the essential part of woody cell walls of plants and consisting of cellulose intimately associated with lignin and hemicellulose.

The terms "lignocellulose fibres" and "lignocellulosic fibres" are recognized by those skilled in the areas of natural product and plant sciences to mean fibres isolated from wood or other fibrous plant materials. Examples of plant materials having a great potential as a source of lignocellulosic fibres are wood, including soft and hard wood, flax, hemp, jute, coconut, cereal grasses and straws. As the name implies, lignocellulose fibres are natural fibres rich in the natural polymers cellulose, lignin and hemicelluloses. These materials are characterized and known to be extremely rich in hydroxyl groups which are functional chemical groups which are extremely sorptive towards water and other polar solvents due to its inherently polar nature. The lignocellulosic fibres are therefore also very sorptive towards water and are notably hygroscopic. The natural structure of the fibres is in the form of an elaborate capillary network of tubes (the empty cell lumina) and micro tubules (cell-wall pores), which creates an excellent sorptive matrix. These factors, coupled with the low cost and renewable, biodegradable nature of lignocellulosic fibres, makes them attractive candidate materials for use in water clean-up applications.

The hydroxyl groups within the fibres, and especially those located on the fibre surface, are also chemically reactive and can be readily chemically modified via reaction with chemical species which are known to react with hydroxyl groups. For example, such groups are readily esterified using reagents such as organic acid anhydrides, organic acid chlorides, well known to chemists familiar with the esterification of alcohols and other materials containing hydroxyl groups. It is known that lignocellulosic fibres, especially wood derived fibres, can be reacted with acid anhydrides to produce fibres that are chemically modified by esterification with non-polar acid anhydrides such as acetic and propionic anhydrides, and this is used to produce fibres that are more water stable for utilization in water-resistant fibreboard type composite products.

The interesting factor is in the present context is that the fibres are of course rendered partially hydrophobic by such a modification, and what was previously a fibrous sorptive matrix with an affinity for water can be transformed, in a relatively straightforward manner, into a sorptive matrix with an increased affinity for hydrophobic liquids and a much reduced affinity for water.

An example of the above mentioned modified lignocellulosic fibre material is described in GB Patent Application 2 248 610 A disclosing a method of absorbing hydrophobic water-immiscible liquids by treating the liquid with a modified lignocellulosic plant material in which hydroxyl groups have been esterified with an aliphatic monocarboxylic acid with 1-4 carbon atoms to render it relatively more absorbent to hydrophobic water-immiscible liquids. The modified fibres are used to absorb oils and related hydrophobic liquids from natural waters and waterways including rivers, lakes, seas, harbours etc. The modified fibres are not able to effectively break emulsions and have therefore limited potential in that they only achieve little more than physical separators.

U.S. Pat. No. 4,804,384 (Rowell et al.) discloses reaction of lignocellulosic material with uncatalyzed acetic anhydride in the absence of any cosolvent. The purpose is to improve dimensional stability and resistance to biological attack of the lignocellulosic material. Thus use as a sorptive material for the removal of oils, metal ions and other contaminants from a fluid medium is not suggested by Rowell.

As appears, there is still a need for a non-expensive sorptive material with improved ability to remove oils and other hydrophobic contaminants from aqueous media and with the additional ability to remove other contaminants from the aqueous media such as ionic materials including heavy metals.

BRIEF DESCRIPTION OF THE INVENTION

Accordingly it is an object of the present invention to provide such non-expensive sorptive material having combined hydrophobic oil sorptive and ion exchanging properties.

Thus the present invention relates to a modified sorptive lignocellulosic fibre material with hydroxyl groups on the lignocellulosic fibres modified in the form of carboxylic acid ester groups, characterized in that the modified hydroxyl groups include groups esterified with a dicarboxylic acid and groups esterified with a monocarboxylic acid.

Furthermore the present invention relates to a process for the preparation of a modified sorptive lignocellulosic fibre material, characterized by the esterification of a lignocellulosic fibre material both (a) with a monocarboxylic acid or an active derivative thereof, and (b) with a dicarboxylic acid or an active derivative thereof.

The esterification steps (a) and (b) may be carried out in optional order or concurrently.

The present invention also relates to a method for the removal of oils and other contaminants from aqueous media wherein the contaminants are adsorbed and/or absorbed by the inventive sorptive fibre material.

Finally the present invention relates to the use of the modified sorptive lignocellulosic fibre material for the removal of oils and other contaminants from aqueous media.

The present invention is based on the finding that dramatic improvements in fibre performance are obtained by a "double modification" by which the carboxylic acids used for the esterification of hydroxyl groups of the fibres comprise both one or more monocarboxylic acids and one or more dicarboxylic acids. The reaction with a dicarboxylic acid and a hydroxyl group on the fibre appears to esterify one hydroxyl group with one of the carboxyl groups of the dicarboxylic acid leaving the other carboxyl group as a free pending group, which group depending of the pH will be in the form of a free carboxyl group —COOH or as a carboxylate group —COO$^-$.

In the monocarboxylic acids only one carboxyl group is available for esterification leaving the more hydrophobic end of the monocarboxylic acid as a pending group out from the fibre material.

In the doubly modified fibre pending hydrophobic groups are formed by a first esterification with a monocarboxylic acid, preferably an aliphatic monocarboxylic acid, such as acetic or propionic acid, preferably provided in an active form such as an anhydride or an acid halogenide. This first modification is already known from the above mentioned GB 2 248 610. The further improvement is obtained by a second modification in the form of a second esterification with a dicarboxylic acid preferably provided in an active form such as an acid halogenide or an anhydride, especially a cyclic anhydride, which introduces a pending ionic moiety, in this case a carboxylic acid group, to the fibre. When such a fibre is equilibrated to pH values around neutrality, the pending carboxylic acid groups will be in the form of a partially hydrophobic, salt forming carboxylate group. In such cases, an ionic salt is generated close to the fibre surface, which substantially improves the ability of the material to break emulsions and absorb oil due to a local environment in which the driving force is hydrophobic interaction between the oil and available hydrophobic surface. The hydrophobic surface is located on the same fibre.

The free pending carboxyl groups or carboxylate groups obtained by the esterification with dicarboxylic acids also provide the inventive fibre material with a pronounced cation exchange capacity. Thus the fibre material can concurrently absorb heavy metal and other dissolved contaminating cationic species from aqueous media in an efficient, cost effective manner. It is considered that the new material produced by the "double modification" of lignocellulosic fibres is a significant step forward in the area of water treatment. The invented technology allows for the production and utilization of relatively low-cost, high performance fibres capable of removing oils, other hydrophobic contaminants, heavy metals and other contaminating cationic species, in a single treatment cycle. This is a real advance in the state of the art of environmental control of our water systems.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

The inventive modified fibre material is an excellent sorptive substrate for oils and other hydrophobic liquids dispersed in water. The inventive material can be produced by two types of chemically modifying the hydroxyl groups of the lignocellulosic fibres. By the first modification a portion of the hydroxyl groups are acylated, preferably acetylated. The second modification is a reaction with a dicarboxylic acid anhydride typically in the form of a cyclic anhydride such as maleic anhydride, such that a proportion of the remaining hydroxyl groups on the lignocellulosic fibre surfaces are carboxylated and hydrophobed forming pending groups having a hydrophobic moiety between the esterified carboxyl group and the free carboxyl or carboxylate group. Modified fibre produced in such a way can readily remove oils and other hydrophobic organic materials from water, even when partially or fully emulsified into the water stream. The modified fibre material is a partially hydrophobic, poly salt in that the ionic groups fixed to the surface engender a locally high salt and high ionic strength environment and such a fibre is excellent for absorbing oils and hydrophobic liquids from water, even from an emulsified state. This is because in such an ionic environment, the hydrophobic driving force becomes pronounced and the oil binds readily to hydrophobic regions on the fibre surface.

The anionic carboxylate groups covalently attached to the fibre surface are capable of cation exchange and readily perform this function if the fibres are contacted with metal ions or other cations in aqueous solution. The fibres therefore have the added capacity to remove contaminating heavy metal cations from contaminated water, as well as the ability to absorb oils and other hydrophobic contaminants. This absorption of metal ions by ion exchange does not significantly affect the partially ionic nature of the fibre and therefore helps maintain the performance of the fibre in its concomitant oil-sorbing role.

The new novel fibre product can therefore function as an excellent material for the removal of oils and related hydrophobic liquids from water and/or the removal of heavy metal cations also present in the water stream presented to the fibre. This is a significant advance in the technology as high performance products capable of extensive clean-up of contaminated water, can be produced at relatively low-cost from a natural, renewable resource.

The modified sorptive fibres can be utilized in water cleaning applications in the form of filters, for example packed into a filter cartridge, or in a filter bed, or in the form of a mat wherein the mat is an active filtration layer or part of a filter assembly. Alternatively, a floating fibre mat or boom can be used so as to be placed on a water surface to absorb oils and heavy metal contaminants from the surface layer of the water. Other obvious end applications include the modified fibres loosely packed in a net, porous bag or other such suitable container, allowing application to a water surface or waterstream.

The present inventors have developed methodology for the stepwise or concurrent modification of lignocellulosic fibres, preferably wood fibres, to render them suitable for the absorption of a range of organic materials from water suspension, dispersion, emulsion or partial solution.

Furthermore, the inventive modified fibres have a pronounced cation exchange capacity and can readily absorb heavy metal ions from aqueous solution.

The inventive modified fibres have a partially ionic nature which enhances the binding of oils and other hydrophobic liquids. This is a significant advance in the state of the art.

Accordingly the inventive fibres are usable in a number of devices and set-ups in order to remove contaminants from water-streams, waste-waters, harbour water, lake and seawater, water from road run-off, etc. These devices include filter cartridges, filter mats, bed filters, booms, loose packed nets, bags and the like.

The inventive modified sorptive fibres can be obtained from lignocellulosic fibres, preferably those prepared from the thermo-mechanical, mechanical, semi-chemical or chemical pulping/defibration of wood chips. The lignocellulosic fibres are by a chemical modification rendered more hydrophobic by combined esterification with both an active monocarboxylic acid, such as an alkanoic anhydride and an active dicarboxylic acid such as a cyclic anhydride, e.g. maleic anhydride. The esterification of hydroxyl groups with the cyclic anhydride covalently bonds an ionic, carboxylic acid group to the fibre. The mentioned methods of fibre preparation are well-known to those skilled in the arts of woodpulping, paper-making and fibreboard production.

The modification with the alkanoic anhydride, preferably acetic anhydride, renders the fibre more hydrophobic, replacing a proportion of polar surface hydroxyl groups with non-polar alkyl groups. The acetylation reaction can be performed as a standard esterification under conditions known to the skilled person.

The supplementary modification forming an essential feature of the present invention is the further introduction of a covalently bonded ionic group to the fibre surface, via reaction with an active dicarboxylic acid such as a cyclic anhydride. This is an important step in improving the performance of the fibre towards the absorption and removal of oils and oil-like liquids from water. Thus a bound salt is created within the fibre matrix, improving the ability of the fibre to disrupt emulsions and retain the oil part of the water stream, even at lower oil/water ratios. This is because in such an ionic environment, the hydrophobic driving force becomes pronounced and the oil binds readily to hydrophobic regions on the fibre surface. The covalently bonded ionic group is introduced via reaction of available hydroxyl groups with a cyclic anhydride preferably of the group maleic, succinic, phthalic, most preferably maleic anhydride.

According to the invention the modified sorptive fibre material can be prepared by esterification of a lignocellulosic fibre material a) with a monocarboxylic acid or an active derivative thereof, and b) with a dicarboxylic acid or an active derivative thereof.

The modification can be performed by one of four generic methods, or any obvious variants of these.

Method 1

By mixing dried fibres, which have been previously acetylated, into an aprotic solvent such as pyridine, and adding the required amount of cyclic anhydride to the mixture, then refluxing the mixture for times ranging from 15 minutes to 2 hours. Either hot or after cooling, the fibres are then separated from the liquid phase by filtration and/or centrifugation and/or simple decanting and then re-suspended in a suitable solvent, preferably acetone, ethanol or isopropanol, to dissolve unreacted cyclic anhydride and free acid by-product. The mixture is reheated, preferably to reflux with suitable stirring, and the washed fibres are again removed from the liquid phase by filtration and/or centrifugation and/or simple decanting. Thereafter the modified fibres are dried in an oven or other suitable drying device. Further wash cycles can optionally be performed before final drying.

Method 2

A pre-determined amount of cyclic anhydride is dissolved in a suitable, non-catalysing, aprotic solvent such as acetone or butanone (methyl ethyl ketone) and the resultant solution is added to the fibres, which have been previously acetylated. The fibres and solution are thoroughly mixed using a stirrer or other suitable device and the solvent is removed under vacuum or reduced pressure, again whilst the mixture is stirred or agitated. Of course some gentle heating can be applied to assist the evaporation process. This leaves a dry fibre-mass in which the modifying cyclic anhydride is evenly distributed. The esterification reaction is then achieved by subsequently heating the fibre mass to temperatures between 120° C. and 180° C., most preferably in the range 135° C.-165° C. Reaction times range from 15 minutes to 90 minutes, most preferably 30 minutes to 70 minutes. This can be achieved in any obvious way, for example in an oven, in a heated reactor vessel, or even in a micro-wave oven/reactor. After the reaction period is completed, the dry fibre mass can optionally be put through a number (1-3) of wash cycles as described in method 1 above.

Method 3

The required amount of cyclic anhydride is finely milled to a powder and then thoroughly dry blended into the dry lignocellulosic fibre, which has been previously acetylated. This is achieved using a dry mixer of the type used for mixing, for example, cement or dry powders in general. The modifying agent, cyclic anhydride is consequently evenly blended into the fibre mass. The esterification reaction is achieved by subsequently heating the fibre mass to temperatures between 120° C. and 180° C., most preferably in the range 135° C.-165° C. Reaction times range from 15 minutes to 90 minutes, most preferably 30 minutes to 70 minutes. This can be achieved in any obvious way, for example in an oven, in a heated reactor vessel, or even in a micro-wave oven/reactor. After the reaction period is completed, the dry fibre mass can optionally be put through a number (1-3) of wash cycles as described in method 1 above.

Method 4

By mixing dried fibres, which have not been previously chemically modified, into acetic anhydride, and adding the required amount of cyclic anhydride, dissolved in a minimum further volume of acetic anhydride to the mixture, then refluxing the mixture for times ranging from 15 minutes to 2 hours. Either hot or after cooling, the fibres are separated from the liquor by filtration and/or centrifugation and/or simple decanting and then resuspended in a suitable solvent, preferably acetone, ethanol or isopropanol, to dissolve any unreacted cyclic anhydride and free acid by-product. The mixture is reheated, preferably to reflux with suitable stirring, and the washed fibres are again removed from the liquid phase by filtration and/or centrifugation and/or simple decanting prior to drying in an oven or other suitable drying device. Further wash cycles can optionally be performed before final drying. This approach serves to both acetylate the fibres and to perform the modification with the cyclic anhydride concomitantly in a single step.

The reaction of a lignocellulosic hydroxyl group with one of the carboxyl groups in the dicarboxylic acid anhydride binds the dicarboxylic acid as a monoester leaving the other carboxylic group as a free pending group. This group is a functional cation exchanger group which readily absorbs heavy metal cations such as ions of Cu, Zn, Ni, Cd, Pb, Fe etc, when contacted with the fibre surface in aqueous solution.

An important feature of the inventive fibre material is the combination of the hydrophobic pending groups obtained by the esterification with a monocarboxylic acid and the ion exchanging pending carboxyl or carboxylate groups which latter groups surprisingly are able to perform the absorption of heavy metal cations even from oil containing fluids. Furthermore the combination has the additional beneficial effect of breaking emulsions so as to release emulsified hydrophobic liquids for subsequent sorption by means of the hydrophobic pending groups.

In practice the obtained degree of esterification can be estimated on the basis of the weight gain which typically can be a weight gain of 12-25% by weight by the esterification with acetic acid as the aliphatic monocarboxylic acid and a weight gain of 5-20% by weight by the esterification with maleic acid as the dicarboxylic acid both calculated on the basis of the unmodified fibre material.

The relative degree of esterification can be calculated on the basis of the weight gains obtained after the treatment with the respective carboxylic acids and the molecular weights thereof. Typically the molecular monocarboxylic acid:dicarboxylic acid ratio will be selected between 30:1 and 1:10, preferably between 20:1 and 1:5, more preferred between 10:1 and 1:2.5 and most preferred between 5:1 and 1:1.

The monocarboxylic acid can in principle be any monocarboxylic acid having a hydrophobic moiety, but based on the cost lower alkanoic acids such as formic acid, acetic acid, propionic acid and butanoic acid are preferred.

Similarly the dicarboxylic acid can in principle be any compound having two carboxyl groups. Contemplated dicarboxylic acids includes but is not limited to oxalic acid, malonic acid, succinic acid, glutaric acid, adipic acid, pimelic acid, maleic acid, fumaric acid, pentenedioic acid, citraconic acid, itaconic acid, mesaconic acid, phthalic acid, isophthalic acid and terephthalic acid. As stated above the preferred acids are succinic acid, maleic acid and phthalic acid.

In principle mono- and dicarboxylic acids having substituent groups are also contemplated provided such substituent groups are not detrimental to the efficiency of the sorptive fibre material or even have a beneficial effect thereto.

The esterification of the fibre material may in principle be carried out by any conventional esterification method known to the person skilled in the art. A suitable method is the reaction with an active derivative of the acid, such as acid halides and acid anhydrides. Preferably the acid anhydride is used for the esterification with a dicarboxylic acid, especially a cyclic anhydride.

The inventive modified fibres can be utilized as sorptive substrates in devices such as loose mats, filter cartridges, sorptive booms, filter units and the like, and any other device in which the fibre can be used as the active sorbant for an oil or other organic contaminant of water, or as an ion exchange material or as a combined cation exchanger and oil sorbant.

In a preferred embodiment, the lignocellulosic fibre is obtained from wood, which is preferably, but not necessarily, thermo-mechanically defribrated using known technology that is practiced during the manufacture of medium density fibreboard or alternatively, in the production of newsprint paper. These conventional procedures produce very suitable fibres for subsequent chemical modification.

In a preferred embodiment, the fibre surface hydroxyl groups are firstly esterified with an alkanoic anhydride, preferably acetic anhydride, using a standard method, to a level of acetylation that produces a gain in weight to the dry fibre of between 12% and 23% by weight calculated on the basis of the unesterified dry fibre material. The acylated, preferably acetylated fibre is subsequently reacted with a cyclic anhydride selected from the group of maleic, succinic, and phthalic anhydride, most preferably maleic anhydride using one of the methods 1-3 described above.

In another preferred embodiment the lignocellulose fibres are subjected to concomitant modification with both alkanoic and cyclic anhydrides, preferably, but not exclusively, using acetic and maleic anhydrides using methodology described above (method 4).

The present invention also relates to the use of the modified sorptive fibres to remove oils, other hydrophobic liquids and organic materials from water, including but not limited to waste water, sewage water, run-off from roads, industrial waste water, or from sea water, harbour water, contaminated river water, contaminated lake water and the like.

According to a preferred embodiment the present invention also relates to the use of the modified sorptive fibres to remove heavy metal and other dissolved cationic species from water, including but not limited to waste water, sewage water, run-off from roads, industrial waste water, or from sea water, harbour water, contaminated river water, contaminated lake water and the like.

In a further preferred embodiment the invention relates to the use of the modified sorptive fibres to remove oils, other hydrophobic liquids and organic materials along with heavy metal and other dissolved cationic species from water, including but not limited to waste water, sewage water, run-off from roads, industrial waste water, or from sea water, harbour water, contaminated river water, contaminated lake water and the like.

The inventive modified sorptive fibres are usable for the treatment of water in the form of a filter cartridge, wherein the fibres are packed. Another possible form may be a filter mat, which can be prepared from the fibre by well known technique for mat manufacturing from fibres. The inventive modified sorptive fibres may also be presented to the treatment of water in the form of a boom wherein the fibres are loosely bound in a net case or in a similar way laid on top of the water. The fibres may also be presented to the treatment water in the form of a filter bed, typically as an integral part of a complete water treatment plant.

The inventive fibre material can be produced at relatively low cost. After use it can be utilised as a fuel in a combustion plant for solid fuels. This allows, for example, oils and fibre to be converted to energy and any sorbed metals to be ashed.

The present invention is further illustrated by means of the following non limiting examples

EXAMPLES

Example 1

Acetylation

To 33.33 g of dry thermomechanical fibre pulp (TMP) softwood fibres was added liquid acetic anhydride and the mixture was maintained in a reactor at 120° C. for 1 hour. Thereafter excess of acetic anhydride was squeezed out from the fibre material. The weight of the obtained material was 40 g corresponding to a weight gain of 20% by weight. This example was carried out according to GB 2 248 610.

Example 2

Method 1

20 g of the fibre material obtained in example 1 was added to pyridine (250 ml) in a reaction vessel fitted with a reflux condenser and a stirrer. The mixture was allowed to reflux for 15 minutes to ensure swelling of the suspended fibres. 5 g of maleic anhydride, previously dissolved in 20 ml of pyridine, was added to the mixture, which was then allowed to reflux for 1 hour and then allowed to cool to ambient temperature. The reacted fibres were then separated from the liquor by simple decanting and filtration, and were subsequently re-suspended in acetone, for dissolution of unreacted cyclic anhydride and free acid by-product. The mixture was reheated to reflux with stirring, and the washed fibres were again removed from the liquor by simple decanting and filtration prior to drying in an oven at 60° C. The recovered weight of reactive fibre was measured at 22.8 g, indicating a level of modification by maleic anhydride of 14%.

Example 3

Method 2

Maleic anhydride (10 g) was powdered and dissolved in acetone (200 ml), and the resultant solution was added to 40 g of dry TMP softwood fibres, which had been previously acetylated as in example 1 above, in a buchner flask. The fibres and solution were thoroughly mixed using a mechanical stirrer and the acetone solvent was removed under reduced pressure, again whilst the mixture was stirred. Gentle heating was applied to assist the evaporation process. This left a dry fibre-mass in which the modifying maleic anhydride was evenly distributed. The dry mass was transferred to a 1 liter Pyrex beaker. The esterification reaction was then achieved by subsequently heating the fibre mass to a temperature of 150° C., in a laboratory oven fitted with a vented extractor. The reaction time was 60 minutes. After the reaction period was completed, the dry fibre mass was washed using acetone as described in example 2 above. Finally, the washed, reacted fibre was allowed to dry in a 60° C. oven. The recovered weight of reactive fibre was measured at 44.8 g, indicating a level of modification by maleic anhydride of 12% on a purely weight gain basis.

Example 4

Method 3

Maleic anhydride (10 g) was finely milled to a powder and then thoroughly dry blended into 40 g of the dry TMP softwood fibre which had previously been acetylated to a level of 20% weight gain as described in example 1. This was achieved using a dry mixer fitted with a standard flour mixing blade. The modifying cyclic anhydride was consequently evenly blended into the fibre mass. The esterification reaction was then achieved by subsequently heating the fibre mass to a temperature of 150° C., in a laboratory oven fitted with a vented extractor. The reaction time was 60 minutes. After the reaction period was completed, the dry fibre mass was washed using acetone as described in example 2 above. Finally, the washed, reacted fibre was allowed to dry in a 60° C. oven. The recovered weight of reactive fibre was measured at 43.8 g, indicating a level of modification by maleic anhydride of 9.5% on a purely weight gain basis.

Example 5

Method 4

Dry, unmodified, TMP wood fibres, derived from softwood (40 g) were added to 200 ml of acetic anhydride, into which 20 g of maleic anhydride had previously been dissolved, in a 0.5 Liter reaction vessel. The mixture was then refluxed for 1 hour and allowed to cool. When cool, the fibres were separated from the liquor by simple decanting and filtration, and were subsequently re-suspended in acetone, for dissolution of unreacted cyclic anhydride and free acid by-product. The mixture was reheated to reflux with stirring, and the washed fibres were again removed from the liquor by simple decanting and filtration prior to drying in an oven at 60° C. The recovered weight of reactive fibre was measured at 50.4 g, indicating a level of modification by a mixture of the anhydrides of 26% on a purely weight gain basis. This approach serves to both acetylate the fibres and to perform the modification with the cyclic anhydride concomitantly in a single step.

Example 6

The modified fibre materials obtained in the above examples 2-5 were subjected to a final preparatory step. The dried, modified fibres were suspended in a suitable amount of water in a beaker to ensure easy stirring with a mechanical stirrer. The pH of the suspension was monitored using a standard pH meter. pH values ranging from 3-4.5 were typically encountered. The pH of each suspension was then re-adjusted to close to 7.5 using sodium hydroxide. This ensured the generation of the carboxylate anion on the pendant groups attached due to reaction with the maleic anhydride, rather than the free acid group which occurs at the lower pH. This ensures the activation of the fibre for cation exchange and enhances the ionic nature of the modified fibre.

The fibres were then finally dried from this pH 7.5 solution, using a fan-assisted oven at 80° C.

The obtained modified fibres are usable as sorptive substrates in devices such as loose mats, filter cartridges, sorptive booms, filter units and the like, in fact any obvious device in which the fibre is the active sorbant for an oil or other organic contaminant of water, or as an ion exchange material or as a combined cation exchanger and oil sorbant.

Example 7

In each of 3 separate beakers, approximately 10 g oil (mineral) was added to 100 ml water. To the first beaker (beaker 1), 0.1 g of dry, unmodified, TMP softwood fibres derived from softwood was added to the surface. To the second beaker (beaker 2), 0.1 g of a dry, TMP softwood fibre which had been acetylated (to 20% weight gain, as described in example 1) was added to liquid surface. To the third beaker (beaker 3), 0.1 g of dry TMP softwood fibre, which had been acetylated and then subsequently reacted with maleic anhydride (as described in example 2) was added to the liquid surface.

In all cases, the fibres tended to be clumped into a loose ball and oil was observed to soak into the fibres. After around 10 seconds, the fibre "balls" were scooped up from the beaker (no residual fibres were left behind in any of the samples) and were allowed to drip-off excess oil over a mesh screen for around 30 seconds. The fibre balls were then weighed, with the following results:

| | |
|---|---|
| Beaker 1 (unmodified fibre): | 1.5 g |
| Beaker 2 (acetylated fibre): | 2.6 g |
| Beaker 3 ("double-modified" fibre): | 5.5 g |

It is apparent from this simple test that the new fibre absorbent used in beaker 3 has a high capacity for absorbing oil from a water surface.

Example 8

Exactly the same procedure was performed, with the same fibre batches, (0.1 g each) as in example 7 above, up to the first drip-off, thereafter the ball-shaped masses were placed under pressure corresponding to 100 g. This took place in a glass-fibre filter placed on top of a glass beaker. Each of the fibre balls were subjected to 3 pressings of 30 seconds each, and finally weighed after excess oil was allowed to drip off.

The results were as follows:

| | |
|---|---|
| Fibre mass 1 (unmodified fibre): | 0.7 g |
| Fibre mass 2 (acetylated fibre): | 1.8 g |
| Fibre mass 3 ("double-modified" fibre): | 4.5 g |

The pronounced and greatly improved capacity of the new fibre absorbant to retain absorbed oil is very apparent from this example.

Example 9

Exactly 10.02 g of the fibre produced in example 1, and then activated as in example 5, was packed into a glass column of the type used for column chromatography such as ion exchange or gel filtration. The column was of dimension: internal diameter 2.5 cm, length 21 cm, with a volume of around 100 ml. In essence, the fibre was packed in as the stationary phase. Deionised water was then run through the column for 1 hour, at a rate of 3 mls per minute, to allow the fibres to equilibrate, pack and to remove air bubbles from the system. A solution of 0.02 Molar copper (II) sulphate was then run through the column at the same flow rate and as the blue front advanced onto the fibres, a green coloration developed as the copper (II) ions were adsorbed by the active fibres. Clean water with no absorbance due to hydrated copper (II) cation eluted from the column end until 110 minutes had elapsed, representing a volume of 330 ml, at which point the green colouration had reached the column end, the fibres appeared saturated and blue copper solution started to elute from the system outlet. As the column volume was only around 100 ml, not including the packed fibre, which reduced this more, then a considerable absorption of copper ions by the fibre was observed.

The fibres were carefully removed from the column, washed in deionised water, gently dried in the oven and then weighed. The recovered fibre weighed 10.42 g, suggesting a pick-up of 0.4 g of copper. It is well known that copper carboxylates are green in colour, hence the green coloration of the fibres.

Calculations based on the atomic weight of copper as 64, suggest a cation exchange capacity for copper (II) of at least 0.6-0.7 milliequivalents per gram for this fibre. This represents a reasonably efficient value for a cation exchange material.

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

The invention claimed is:

1. A modified sorptive lignocellulosic fibre material with hydroxyl groups on the lignocellulosic fibres modified in the form of carboxylic acid ester groups, wherein the modified hydroxyl groups include groups esterified with a dicarboxylic acid and groups esterified with a monocarboxylic acid.

2. A sorptive fibre material as claimed in claim 1, wherein the modified hydroxyl groups include groups esterified with one of the carboxyl groups of a dicarboxylic acid leaving the other carboxyl group as a pending functional free carboxyl or carboxylate group.

3. A sorptive fibre material as claimed in claim 1, wherein the fibre material by a first esterification with the aliphatic monocarboxylic acid of 1 to 4 carbon atoms or an active derivative thereof has a weight gain of 12-25% by weight and by a second esterification with the dicarboxylic acid or an active derivative thereof has a further weight gain of 5-20% by weight both calculated on the basis of the unmodified fibre material.

4. A sorptive fibre material as claimed in claim 1, wherein the first esterification has been made with acetic acid, propionic acid and/or an active derivative thereof and the second esterification has been made with succinic acid, maleic acid, phthalic acid and/or an active derivative thereof.

5. A sorptive fibre material as claimed in claim 1, wherein the esterification has been made with an aliphatic monocarboxylic anhydride and a cyclic dicarboxylic anhydride.

6. A process for the preparation of a modified sorptive lignocellulosic fibre material, whereby a lignocellulosic fibre material is esterfied
   a) with a monocarboxylic acid or an active derivative thereof, and
   b) with a dicarboxylic acid or an active derivative thereof.

7. A process as claimed in claim 6, whereby the esterification steps a) and b) are carried out as a two steps process with step a) before step b) or step b) before step a) or simultaneously as a one step process.

8. A process as claimed in claim 6, whereby the monocarboxylic acid is an aliphatic monocarboxylic acid with 1 to 4 carbon atoms and that the dicarboxylic acid is used as a cyclic anhydride.

9. A modified sorptive lignocellulosic fibre material obtainable by isolation of lignocellulosic fibre from a plant material and esterification of the fibre material
  a) with a monocarboxylic acid or an active derivative thereof, and
  b) with a dicarboxylic acid or an active derivative thereof.

10. A method for the removal of oils and other contaminants from a fluid medium wherein the contaminants are adsorbed and/or absorbed by a sorptive fibre material according to claim 1 or obtained according to a process for the preparation of a modified sorptive lignocellulosic fibre material whereby a lignocellulosic fibre material is esterfied
  a) with a monocarboxylic acid or an active derivative thereof, and
  b) with a dicarboxylic acid or an active derivative thereof.

11. A method for the removal of oils and other contaminants from a fluid medium as claimed in claim 10 wherein further contaminants are removed by ionic exchange with pending free carboxyl or carboxylate groups in the modified lignocellulosic fibre material.

12. A method as claimed in claim 10, characterized in that the fluid medium is an aqueous medium.

13. Use of the modified sorptive lignocellulosic fibre material according to claim 1 or obtained according to a process for the preparation of a modified sorptive lignocellulosic fibre material whereby a lignocellulosic fibre material is esterfied
  a) with a monocarboxylic acid or an active derivative thereof, and
  b) with a dicarboxylic acid or an active derivative thereof, for the removal of oils and other contaminants from a fluid medium.

* * * * *